(12) United States Patent
Gutman et al.

(10) Patent No.: US 11,824,570 B1
(45) Date of Patent: Nov. 21, 2023

(54) ERROR PARAMETERS FOR COMMUNICATIONS THAT USE DIGITAL POST DISTORTION AT A RECEIVING DEVICE

(71) Applicant: QUALCOMM Incorporated, San Diego, CA (US)

(72) Inventors: Igor Gutman, Hod HaSharon (IL); Pushkar Bajirao Kulkarni, San Diego, CA (US); Joseph Patrick Burke, Carlsbad, CA (US); Juergen Cezanne, Ocean Township, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/934,759

(22) Filed: Sep. 23, 2022

(51) Int. Cl.
*H04B 1/12* (2006.01)

(52) U.S. Cl.
CPC ..................... *H04B 1/12* (2013.01)

(58) Field of Classification Search
CPC ....................................................... H04B 1/12
See application file for complete search history.

(56) References Cited

U.S. PATENT DOCUMENTS

| | | | | |
|---|---|---|---|---|
| 8,498,369 B2* | 7/2013 | Forrester | ................ | H04L 27/38 375/232 |
| 11,038,739 B1* | 6/2021 | Landis | ................ | H04B 1/1027 |
| 2009/0316826 A1* | 12/2009 | Koren | ................ | H04L 27/366 375/296 |
| 2016/0034421 A1* | 2/2016 | Magesacher | ........ | H04L 27/3427 703/2 |
| 2019/0190552 A1* | 6/2019 | Sagi | .......................... | H03F 3/24 |
| 2021/0105079 A1* | 4/2021 | Lei | ....................... | H04J 13/0003 |
| 2021/0119682 A1* | 4/2021 | Gutman | ............ | H04L 25/03006 |
| 2022/0368483 A1* | 11/2022 | Kutz | ........................ | H04L 27/20 |
| 2023/0189162 A1* | 6/2023 | Gutman | ............. | H04W 52/146 455/522 |

* cited by examiner

*Primary Examiner* — Junpeng Chen
(74) *Attorney, Agent, or Firm* — Harrity & Harrity, LLP

(57) ABSTRACT

Various aspects of the present disclosure generally relate to wireless communication. In some aspects, a first wireless communication device (WCD) may receive an indication of an error parameter associated with communications that use digital post distortion (DPoD) at the first WCD. The WCD may receive, from a second WCD, a communication based at least in part on the error parameter, wherein the communication has digital peak-to-average-power-ratio (PAPR) reduction applied, and wherein receiving the communication comprises application of DPoD to the communication. Numerous other aspects are described.

30 Claims, 10 Drawing Sheets

ERROR PARAMETERS FOR COMMUNICATIONS THAT USE DIGITAL POST DISTORTION AT A RECEIVING DEVICE

FIELD OF THE DISCLOSURE

Aspects of the present disclosure generally relate to wireless communication and to techniques and apparatuses for error parameters for communications that use digital post distortion at a receiving device.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first wireless communication device (WCD). The method may include receiving an indication of an error parameter associated with communications that use digital post distortion (DPoD) at the first WCD. The method may include receiving, from a second WCD, a communication based at least in part on the error parameter, wherein the communication has digital peak-to-average-power-ratio (PAPR) reduction applied, and wherein receiving the communication comprises application of DPoD to the communication.

Some aspects described herein relate to a method of wireless communication performed by a second WCD. The method may include transmitting an indication of an error parameter associated with communications that use DPoD at a first WCD. The method may include transmitting, to the first WCD, a communication based at least in part on the error parameter, wherein the communication has digital PAPR reduction applied.

Some aspects described herein relate to a first WCD for wireless communication. The first wireless communication device may include a memory and one or more processors coupled to the memory. The one or more processors may be configured to receive an indication of an error parameter associated with communications that use DPoD at the first WCD. The one or more processors may be configured to receive, from a second WCD, a communication based at least in part on the error parameter, wherein the communication has digital PAPR reduction applied, and wherein receiving the communication comprises application of DPoD to the communication.

Some aspects described herein relate to a second WCD for wireless communication. The second wireless communication device may include a memory and one or more processors coupled to the memory. The one or more processors may be configured to transmit an indication of an error parameter associated with communications that use DPoD at a first WCD. The one or more processors may be configured to transmit, to the first WCD, a communication based at least in part on the error parameter, wherein the communication has digital PAPR reduction applied.

Some aspects described herein relate to a non-transitory computer-readable medium that stores a set of instructions for wireless communication by a first WCD. The set of instructions, when executed by one or more processors of the WCD, may cause the WCD to receive an indication of an error parameter associated with communications that use DPoD at the first WCD. The set of instructions, when executed by one or more processors of the WCD, may cause the WCD to receive, from a second WCD, a communication based at least in part on the error parameter, wherein the communication has digital PAPR reduction applied, and wherein receiving the communication comprises application of DPoD to the communication.

Some aspects described herein relate to a non-transitory computer-readable medium that stores a set of instructions for wireless communication by a second WCD. The set of instructions, when executed by one or more processors of the WCD, may cause the WCD to transmit an indication of an error parameter associated with communications that use DPoD at a first WCD. The set of instructions, when executed by one or more processors of the WCD, may cause the WCD to transmit, to the first WCD, a communication based at least in part on the error parameter, wherein the communication has digital PAPR reduction applied.

Some aspects described herein relate to an apparatus for wireless communication. The apparatus may include means for receiving an indication of an error parameter associated with communications that use DPoD at the apparatus. The apparatus may include means for receiving, from a WCD, a communication based at least in part on the error parameter, wherein the communication has digital PAPR reduction applied, and wherein receiving the communication comprises application of DPoD to the communication.

Some aspects described herein relate to an apparatus for wireless communication. The apparatus may include means for transmitting an indication of an error parameter associated with communications that use DPoD at a WCD. The apparatus may include means for transmitting, to the WCD, a communication based at least in part on the error parameter, wherein the communication has digital PAPR reduction applied.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
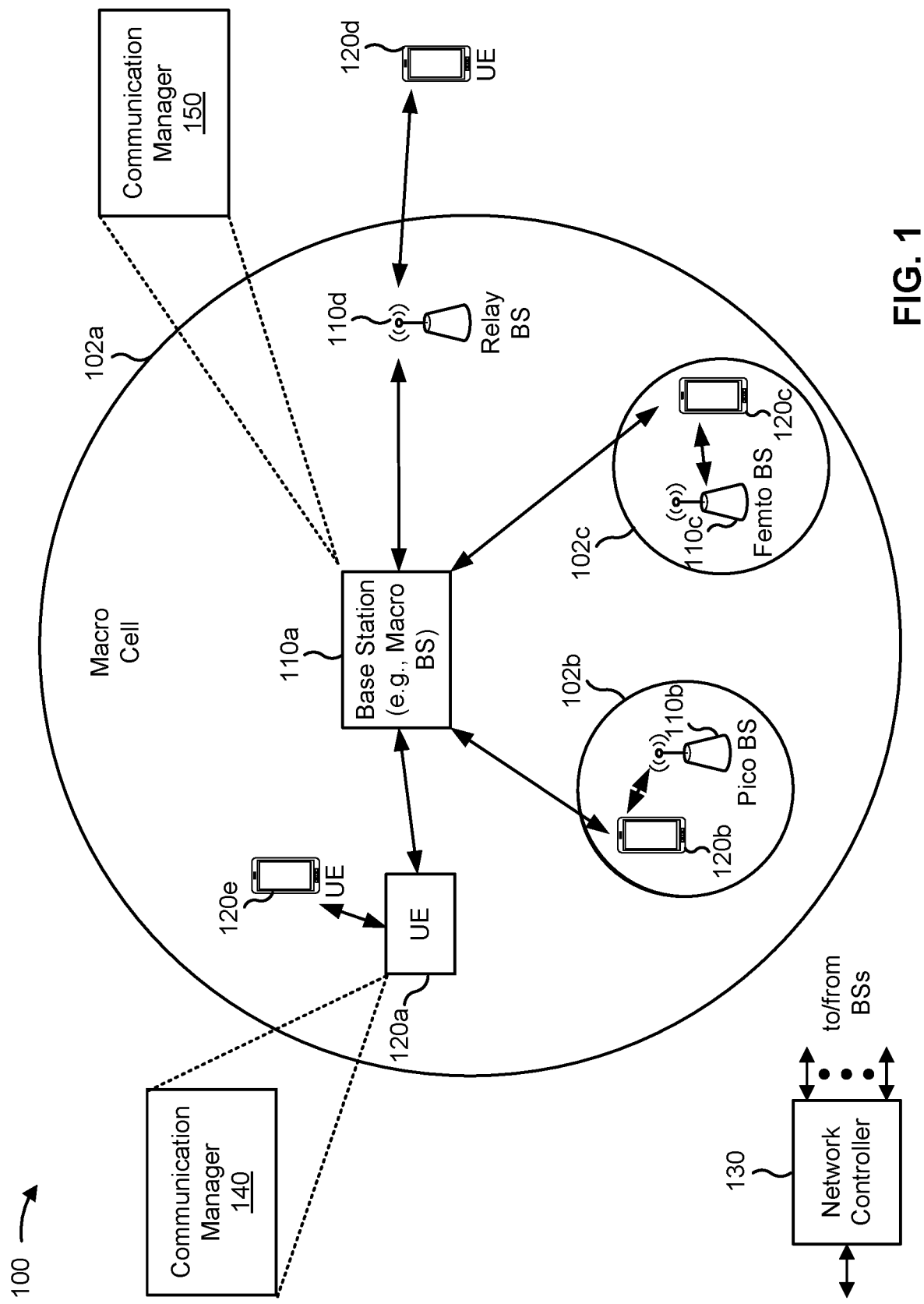
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) MC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the first wireless communication device (WCD) may include a communication manager 140 or 150. For example, the first WCD may include, or may be included in, a UE 120 or a network node 110. As described in more detail elsewhere herein, the communication manager 140 or 150 may receive an indication of an error parameter associated with communications that use digital post distortion (DPoD) at the first WCD; and receive, from a second WCD, a communication based at least in part on the error parameter, wherein the communication has digital peak-to-average power ration (PAPR) reduction applied, and wherein receiving the communication comprises application of DPoD to the communication. Additionally, or alternatively, the communication manager 140 or 150 may perform one or more other operations described herein.

In some aspects, the second WCD may include a communication manager 140 or 150. For example, the second WCD may include, or may be included in, a UE 120 or a network node 110. As described in more detail elsewhere herein, the communication manager 140 or 150 may transmit an indication of an error parameter associated with communications that use DPoD at a first WCD; and transmit, to the first WCD, a communication based at least in part on the error parameter, wherein the communication has digital PAPR reduction applied. Additionally, or alternatively, the communication manager 140 or 150 may perform one or more other operations described herein.

As indicated above, FIG. 1 is provided as an example. Other examples may differ from what is described with regard to FIG. 1.

Figure 2:
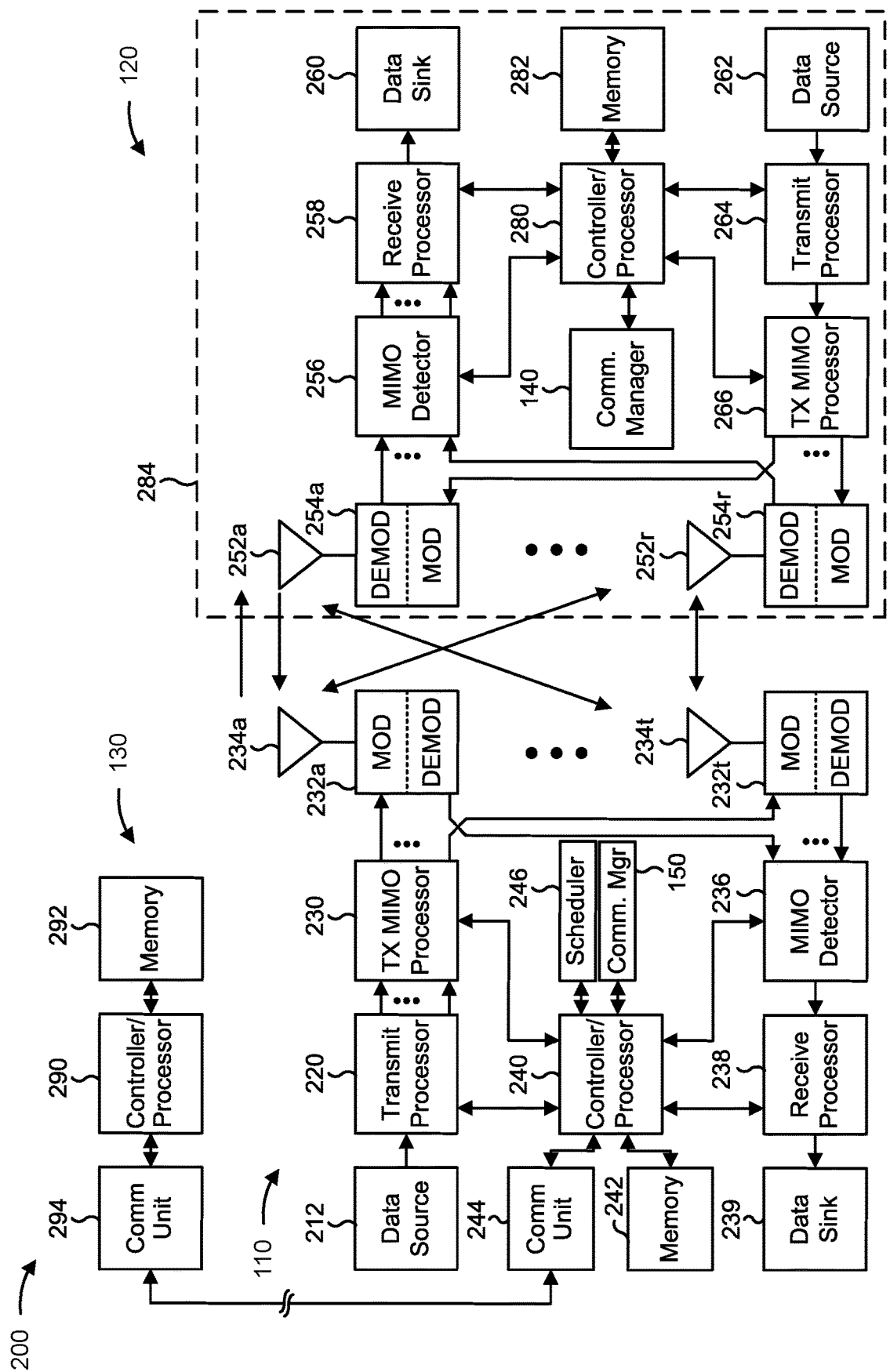
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-10).

The controller/processor 240 of the network node 110, the controller/processor 280 of the UE 120, and/or any other component(s) of FIG. 2 may perform one or more techniques associated with error parameters for communications that use DPoD at a receiving device, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the first WCD includes means for receiving an indication of an error parameter associated with communications that use DPoD at the first WCD; and/or means for receiving, from a second WCD, a communication based at least in part on the error parameter, wherein the communication has digital PAPR reduction applied, and wherein receiving the communication comprises application of DPoD to the communication. In some aspects, the means for the first WCD to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the first WCD to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the second WCD includes means for transmitting an indication of an error parameter associated with communications that use DPoD at a first WCD; and/or means for transmitting, to the first WCD, a communication based at least in part on the error parameter, wherein the communication has digital PAPR reduction applied. In some aspects, the means for the second WCD to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the second WCD to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
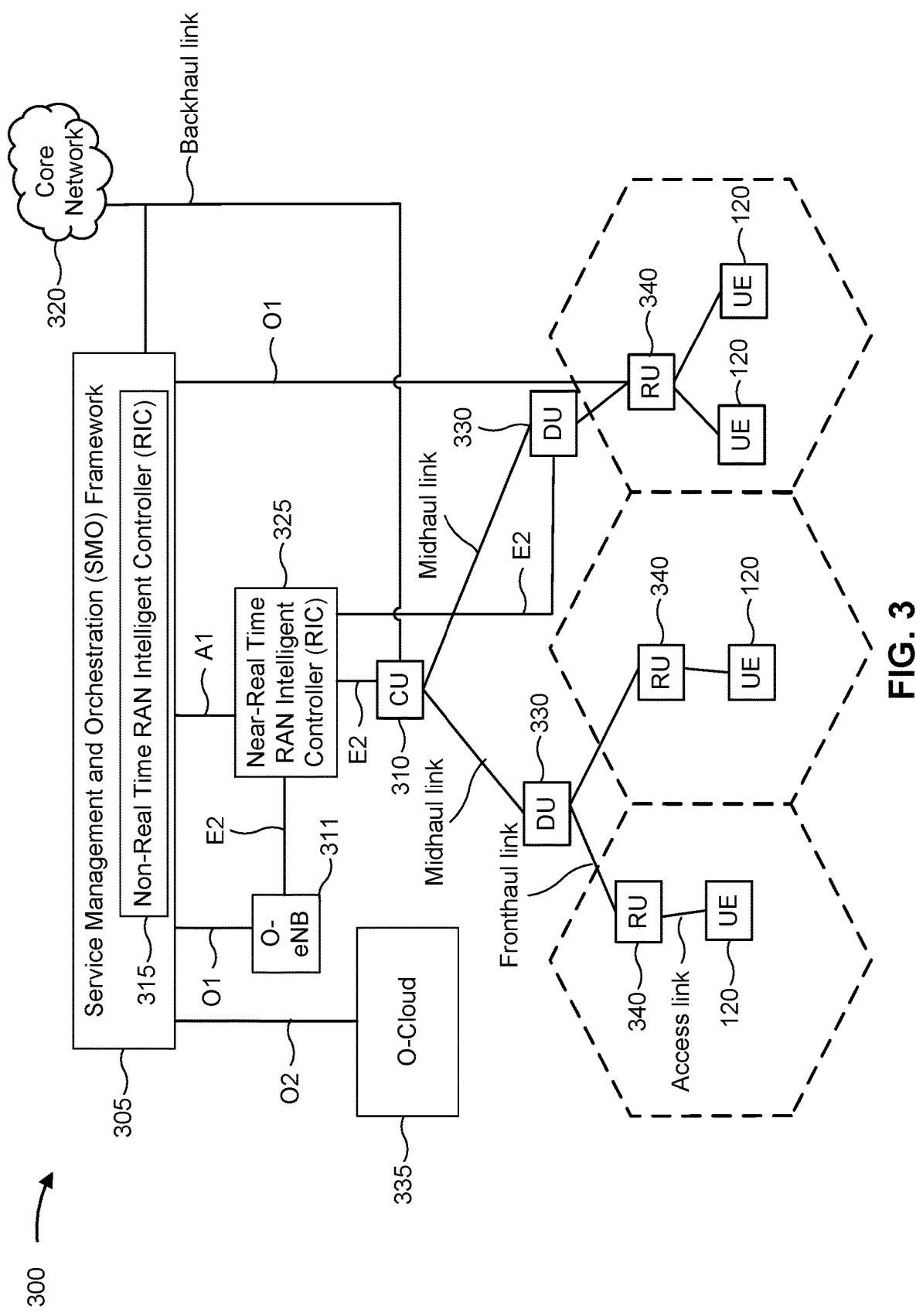
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 335) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
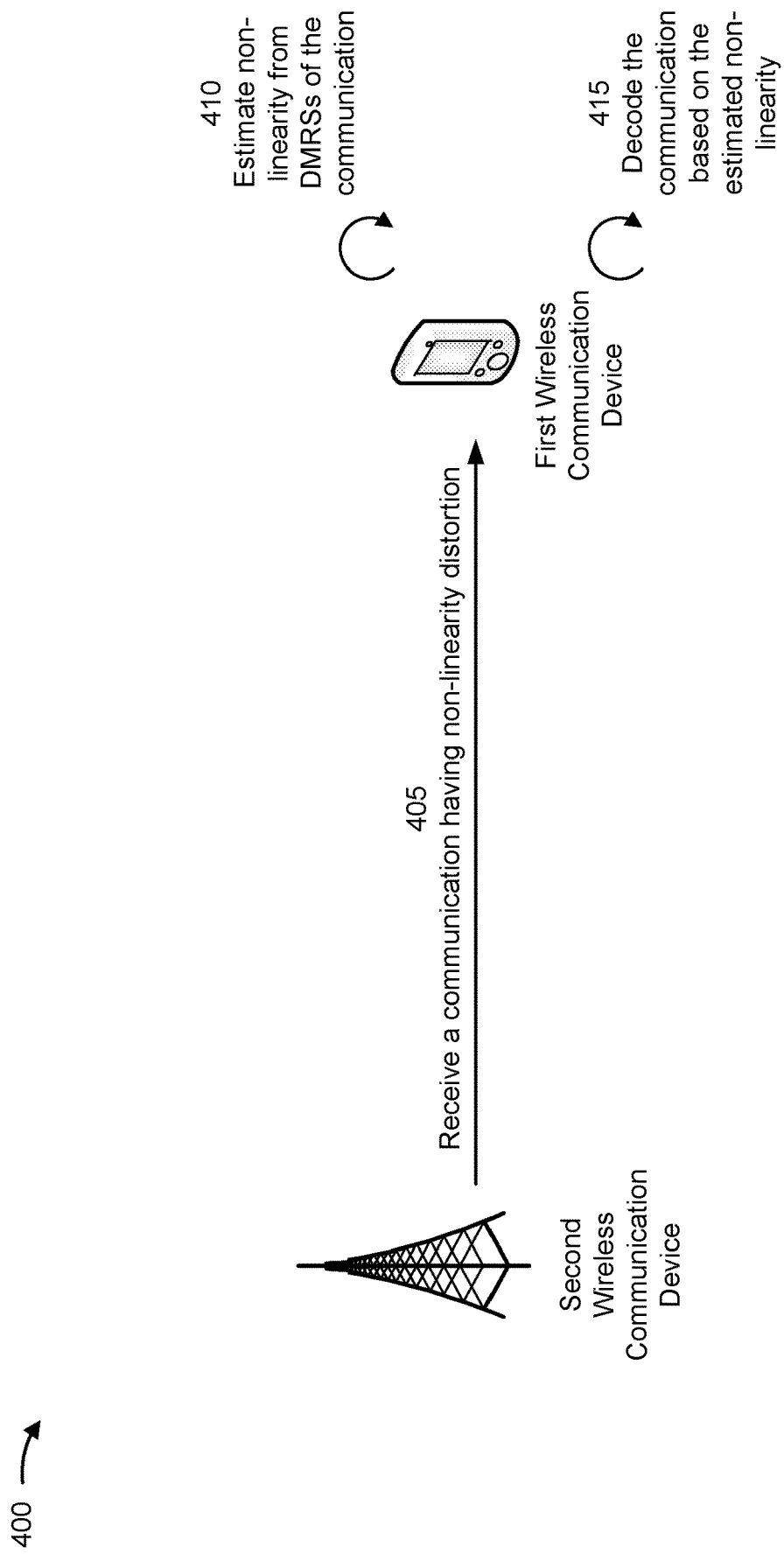
FIG. 4 is a diagram illustrating an example of communicating using nonlinear (NL) distortion, in accordance with the present disclosure.

FIG. 4 is a diagram illustrating an example 400 of communicating using nonlinear (NL) distortion, in accordance with the present disclosure. As shown in FIG. 4, a first WCD and a second WCD may communicate based on transmitting communications with NL distortion and attempting to decode communications with NL distortion. The first WCD may include or may be included in a UE (e.g., UE 120) or a network node (e.g., network node 110 or a repeater). The second node may include or may be included in a UE (e.g., UE 120) or a network node (e.g., network node 110 or a repeater).

As shown by reference number 405, the second WCD may transmit, and the first WCD may receive, a communication having NL distortion. The second WCD may transmit the communication having NL distortion based on the second WCD using nonlinear components, such as high-power power amplifiers (PAs) with limited linear dynamic range (DR), and a polynomial response. The NL distortions may be classified as in-band distortion, which affects a link performance (e.g., an error vector magnitude (EVM)), and an out-band distortion, which corresponds to an amount of adjacent channel interference (ACI).

To reduce NL distortions, power output back-off (boOut) may be used to reduce a transmission power used to transmit the communication. However an increase in boOut may cause a reduction in power amplifier efficiency (PAE). The reduction of PAE may correspond to a reduction of power transmitted on the channel and an increase in energy dissipated as heat.

As shown by reference number 410, the second node may estimate NL of the communication using DMRSs or other reference signals of the communication. For example, the second node may use a sequence associated with the DMRSs to estimate NL distortion of the signal and to correct a received signal for the NL distortion. This may include DPoD correction.

As shown by reference number 415, the second node may decode the communication based on the estimated NL of the communication.

As indicated above, FIG. 4 is provided as an example. Other examples may differ from what is described with regard to FIG. 4.

In some networks, NL may be introduced to a signal based at least in part on limitations of a PA, as described above. In some networks, the NL may be introduced using a crest factor reduction (CFR) function (also referenced as "CFR") to reduce PAPR by compressing a signal, in a power domain, before providing the signal to the PA. In this way, the CFR may reduce a distortion of the PA.

In some networks, a complementary method to boOut, is to use CFR and a digital pre-distortion (DPD) function in a digital front end (DFE) of a transmitting WCD. The CFR reduces a dynamic range (e.g., in power and/or voltage) of the signal, and the DPD assists to reduce an amount of distortions. As a result, the boOut is reduced and PA efficiency is improved.

However, the CFR comes with a cost. Some CFRs are distortion-less, while others (such as iterative clip and filtering (ICF)) introduce in-band distortion (e.g., EVM) and/or out-band distortion (e.g., adjacent channel leakage ratio (ACLR)).

The CFR approach digitally reduces the PAPR, but it may also increase the EVM, as a result of folding the out-band interference to the in-band.

For example, for 30 kilohertz (Khz) subcarrier spacing (SCS) with 106 resource blocks (RBs), the CFR may provide advantages to PAPR with a cost of EVM. The transmission EVM is based at least in part on an ICF PAPR target, a communication protocol may set a minimal EVM requirement per modulation, which may dictate the PAPR target.

In some designs, the ICF may place a cost as in-band distortion, or out-band distortion, depending on the requirements of a communication protocol. For example, in some networks, the entire cost is in-band to maintain a high ACLR requirement (e.g., in FR1).

In an example, for a target PAPR of −3 dB (e.g. output PAPR~2.5 dB), an achievable ACLR may be 60 dB (e.g., with boOut of ~3 dB) when effective DPD is applied. For higher bands (e.g., FR2 and above), ACLR requirements may be reduced, and therefore a smaller cost may be placed on the in-band EVM.

DPoD is a receiver function to correct distortion of a signal caused by a PA and/or a CFR. DPoD may be configured to handle EVM (e.g., without concern for ACLR in the receiver). DPoD may be used for higher bands (e.g., FR2 and above) where ACLR constraints are relaxed and therefore the DPoD may focus on fixing the EVM that is caused by high PA compression.

In the example, in which the distance/link budget is defined by $$\lambda = \frac{P_{sat}}{P_N} = 33 \text{ dB},$$

and a sharpness factor of the PA is ρ=2, DPoD provides an improvement of performance and reduced boOut.

In higher bands (e.g., FR2), no CFR and no DPD may be applied based at least in part on relaxed ACLR requirements.

In lower bands (e.g., FR1), DPoD may be applied. In FR1, for example, a primary limitation may be ACLR, which may limit DPoD (e.g., in addition to CFR and/or DPD) based at least in part on minor clipping of the signal (e.g., beyond a PAPR out of the CFR) may violate an ACLR parameter.

When CFR and DPD and boOut are applied to reduce the PAPR (e.g., to avoid clipping), the CFR with DPD and PA may be linear, and therefore the DPoD may not improve a received signal.

In some aspects described herein, DPoD may be configured with orientation based at least in part on a CFR. For example, the EVM due to ICFs, or any other CFR method, may treated as part of an NL system of the transmitting WCD. In some aspects, a PAPR target of the CFR may be configured based at least in part on balancing the PAPR gains with associated EVM costs. The receiving WCD may correct an increased EVM using DPoD. To support this configuration, a EVM parameters may be updated based at least in part on using DPoD. For example, a 256 quadrature amplitude modulation (QAM) EVM requirement may be reduced to less than 20 dB from 32 dB+ when DPoD is used by the receiving WCD.

In some aspects, the transmitting WCD may have a capability to signal one or more parameters of a CFR function used for PAPR reduction, and the receiving WCD may use the one or more parameters to improve modeling of the CFR (e.g., NL of the CFR). Additionally, or alternatively, the receiving WCD may estimate the CFR model based at least in part on received signals.

In some aspects, the transmitting WCD or a control WCD (e.g., a gNB, a CU, a DU, and/or an RU) may transmit an indication of an EVM parameter (e.g., maximum EVM) of the CFR to be used when DPoD is enabled. In some aspects, the transmitting WCD or the control WCD may transmit an indication of an additional EVM parameter to be used when DPoD is not enabled.

In some aspects, the EVM parameter may be associated with EVM before or after a transmitted signal is provided to the PA. In some aspects, the transmitting WCD or control WCD may provide a first EVM parameter associated with the transmitted signal before being provided to the PA and a second EVM parameter associated with the transmitted signal before being provided to the PA. For post PA, the receiving WCD may not distinguish between models of the PA, DPD function, and/or CFR function and may look at an entire NL model as an NL block to be corrected.

In some aspects, the transmitting WCD and/or the receiving WCD may transmit an indication of support for using an EVM parameter that is to be used when the receiving WCD uses DPoD. In some aspects, the transmitting WCD and the receiving WCD may negotiate desired limitations of EVM. For example, the transmitting WCD and the receiving WCD may use layer 1, layer 2, and/or RRC signaling to select the EVM parameter that is to be used when the receiving WCD uses DPoD. In some aspects, the receiving WCD may indicate an amount of EVM correction that the receiving WCD can perform using a DPoD model of the WCD and/or based at least in part on computing resources (e.g., processing and/or memory) available to apply to the DPoD model. In some aspects, the EVM parameter may be based at least in part on MCS, waveform, and/or rank associated with a communication associated with the EVM parameter.

In some aspects, the transmitting WCD may transmit an indication of a CFR model. For example, the multiple candidate CFR models may be known to the transmitting WCD and the receiving WCD (e.g., based at least in part on indications within a communication protocol), and the transmitting WCD may transmit an indication (e.g., an index) to select the CFR model from the multiple candidate CFR models. In some aspects, the transmitting WCD may use layer 1, layer 2, and/or RRC signaling to transmit the indication of the CFR model. In some aspects, the CFR model may have values associated with a number of iterations, a frequency selectivity, and/or clipping modeling, among other examples. In some aspects, the CFR model may indicate a PAPR out value. In some aspects, an amount of information provided to indicate the CFR model and/or which CFR model is used by the transmitting WCD may be negotiated between the transmitting WCD and the receiving WCD. In some aspects, the CFR model that is used by the transmitting WCD may be based at least in part on MCS, waveform, and/or rank of a communication associated with the CFR model.

In some aspects, the transmitting WCD and the receiving WCD may have a communication link, such as a Uu link (e.g., an access link and/or a multi-hop connection that includes an access link) or a sidelink. The communications transmitted in associated with the EVM requirement and application of DPoD at the receiving WCD may be unicast transmissions. In some aspects, the transmitting WCD and the receiving WCD may be some combination of UEs and/or network nodes (e.g., CUs, DUs, RUs, and/or relays).

In some aspects, the EVM parameter may include a target PAPR that is lower for communications where DPoD is to be used by the receiving WCD (and with a higher permitted EVM) and a target PAPR that is higher for communications where DPoD is not to be used by the receiving WCD (and with a lower permitted EVM).

Based at least in part on using an EVM parameter and/or an associated target PAPR that is associated with use of DPoD by the receiving device, the transmitting WCD and/or the receiving WCD may balance EVM with PAPR reduction to improve a communication link. In this way, the transmitting WCD and the receiving WCD may communicate with increased link budget, which may support conservation of power resources that may otherwise have been used to transmit a communication, may increase spectral efficiency based at least in part on using a higher MCS, and/or increase a range of the communication.

Figure 5:
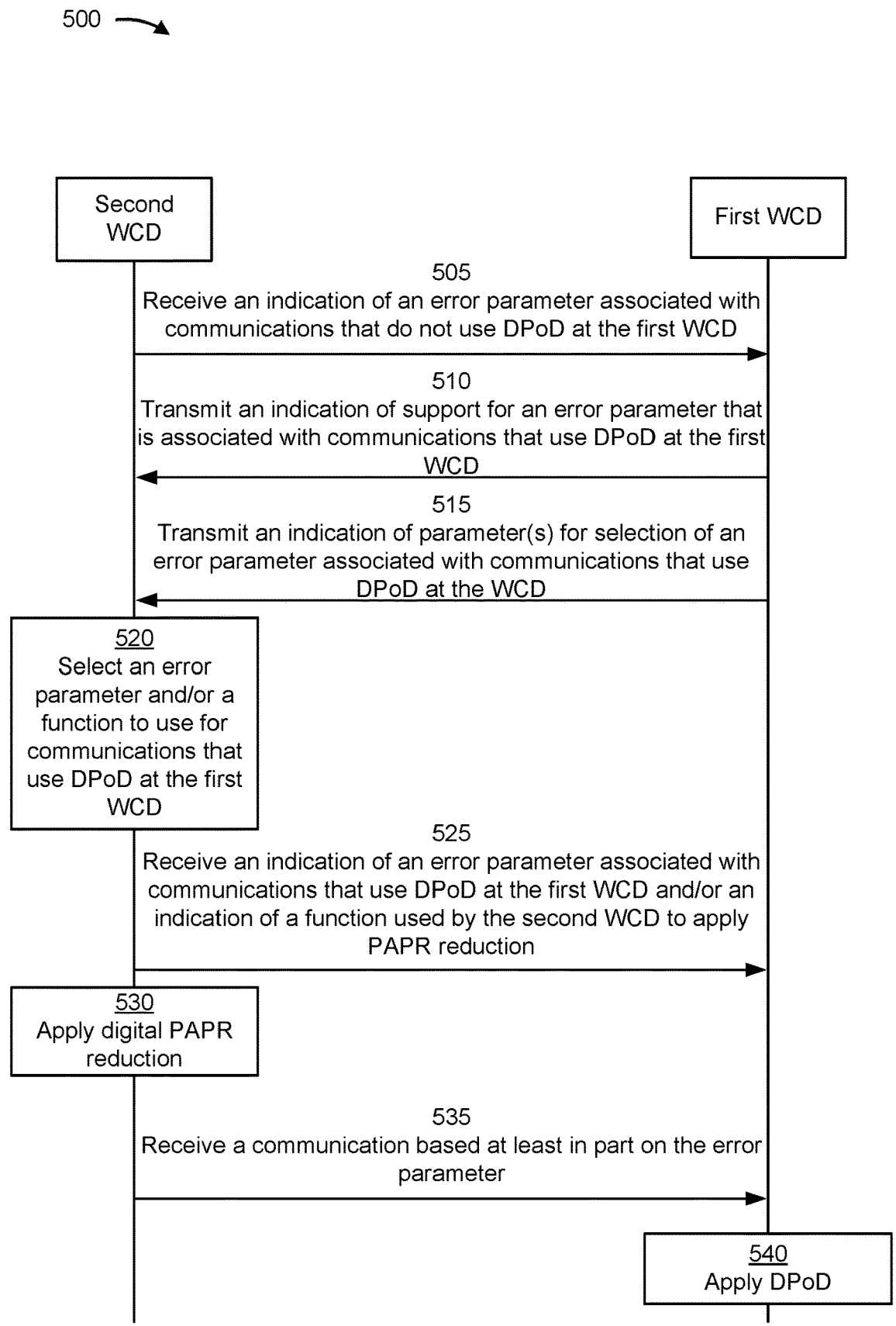
FIG. 5 is a diagram of an example associated with error parameters for communications that use digital post distortion (DPoD) at a receiving device, in accordance with the present disclosure.

FIG. 5 is a diagram of an example 500 associated with error parameters for communications that use DPoD at a receiving device, in accordance with the present disclosure. As shown in FIG. 5, a first WCD (e.g., a UE, network node 110, a CU, a DU, an RU, and/or a relay) may communicate with a second WCD (e.g., a UE, network node 110, a CU, a DU, an RU, and/or a relay). In some aspects, the first WCD and the second WCD may be part of a wireless network (e.g., wireless network 100). In some aspects, a communication link between the first WCD and the second WCD may include a Uu link, a sidelink, and/or a backhaul wireless link.

As shown by reference number 505, the first WCD may receive, and the second WCD may transmit, an indication of an error parameter associated with communications that do not use DPoD at the first WCD. The error parameter may include an EVM-based parameter, such as an EVM limit.

As shown by reference number 510, the first WCD may transmit, and the second WCD may receive, an indication of support for an error parameter that is associated with communications that use DPoD at the first WCD. In some aspects, the first WCD may indicate that the first WCD supports multiple error parameters that are to be used depending on whether the first WCD is to apply DPoD on an associated communication.

As shown by reference number 515, the first WCD may transmit, and the second WCD may receive, an indication of one or more parameters for selection of an error parameter associated with communications that use DPoD at the WCD. For example, the first WCD may indicate an amount of error reduction that the first WCD may perform (e.g., using the DPoD) in reception of a communication. In some aspects, the first WCD may indicate available resources to use for DPoD. In some aspects, the error parameter (e.g., an EVM parameter, such as an EVM limit) may be negotiated between the first WCD and the second WCD. In some aspects, the first WCD and the second WCD may exchange information associated with selection of the function and/or one or more parameters of the function.

As shown by reference number 520, the second WCD may select an error parameter and/or a function to use for communications that use DPoD at the first WCD. In some aspects, the second WCD may select the error parameter based at least in part on feedback from the first WCD, such as the indication described in connection with reference number 515 and/or a capability report. In some aspects, the second WCD may select the error parameter based at least in part on a MCS of the communications, a waveform of the communications, and/or a rank of the communications, among other examples. In some aspects, the second WCD may select the function to use based at least in part on a MCS of the communications, a waveform of the communications, and/or a rank of the communications, among other examples.

As shown by reference number 525, the first WCD may receive, and the second WCD may transmit, an indication of an error parameter associated with communications that use DPoD at the first WCD and/or an indication of a function used by the second WCD to apply PAPR reduction. In some aspects, the error parameter includes an EVM parameter (e.g., an EVM limit). In some aspects, the indication of the error parameter may be associated with an error of a transmitted signal as provided to a PA of the second WCD or an error of the transmitted signal as provided from the PA of the second WCD. In some aspects, the indication of the error parameter may indicate both of an error parameter of the transmitted signal as provided to the PA and an error parameter of the transmitted signal as provided from the PA.

In some aspects, the error parameter associated with communications that use DPoD at the first WCD may be a candidate error parameter (e.g., along with the error parameter associated with communications that do not use DPoD at the first WCD) that may be used based at least in part on whether the first WCD is to apply DPoD to the communication. For example, the error parameter associated with communications that use DPoD at the first WCD may have a relaxed error requirement (e.g., allowing increased error) based at least in part on application of DPoD to the communications compensating for the relaxed error requirement.

In some aspects, the indication of the function used by the second WCD to apply PAPR reduction may support the first WCD applying DPoD with reduced complexity and/or reduced latency. Alternatively, the first WCD may estimate the function based at least in part on the communication, one or more additional signals, and/or a machine learning model, among other examples. In some aspects, the indication of the function may indicate a frequency selectivity, a clipping model, and/or, a number of iterations used in the function, among other examples. In some aspects, the indication of the function may identify parameters of an output of the function, such as a PAPR output of the function. In some aspects, the indication of the function may identify a selection of the function from a set of candidate functions known to the transmitting WCD and the receiving WCD (e.g., known via configuration information and/or a communication protocol).

As shown by reference number 530, the second WCD may apply digital PAPR reduction. For example, the second WCD may use a CFR to digitally reduce PAPR before providing a signal associated with communication to a PA. In some aspects, the second WCD may apply digital PAPR reduction before providing a signal to a PA. For example, the second WCD may use a CFR function to compress a power of a signal based at least in part on, for example, reducing power associated with power peaks of the signal. The digital PAPR reduction may be performed in the alternative to, or in addition to, analog PAPR reduction. Analog PAPR reduction may be performed by a PA using, for example, clipping of the power peaks of the signal.

As shown by reference number 535, the first WCD may receive, and the second WCD may transmit, a communication based at least in part on the error parameter. For example, the communication may have an error parameter that allows for increased error (e.g., EVM limit) based at least in part on the first WCD using DPoD to receive the communication. In some aspects, the communication may have a reduced PAPR (e.g., an improved PAPR) based at least in part on allowing for an increased error.

As shown by reference number 540, the first WCD may apply DPoD to the communication. For example, the first WCD may apply the DPoD to reduce signal errors and/or NL in the communication. In some aspects, the first WCD may apply DPoD that is based at least in part on the indication of the function used by the second WCD to apply PAPR reduction. For example, the DPoD may be based at least in part on a frequency selectivity, a clipping model, and/or, a number of iterations used in the function.

Based at least in part on using an EVM parameter and/or an associated target PAPR that is associated with use of DPoD by the receiving device, the transmitting WCD and/or the receiving WCD may balance EVM with PAPR reduction to improve a communication link. In this way, the transmitting WCD and the receiving WCD may communicate with increased link budget, which may support conservation of power resources that may otherwise have been used to transmit a communication, may increase spectral efficiency based at least in part on using a higher MCS, and/or increase a range of the communication.

As indicated above, FIG. 5 is provided as an example. Other examples may differ from what is described with respect to FIG. 5.

Figure 6:
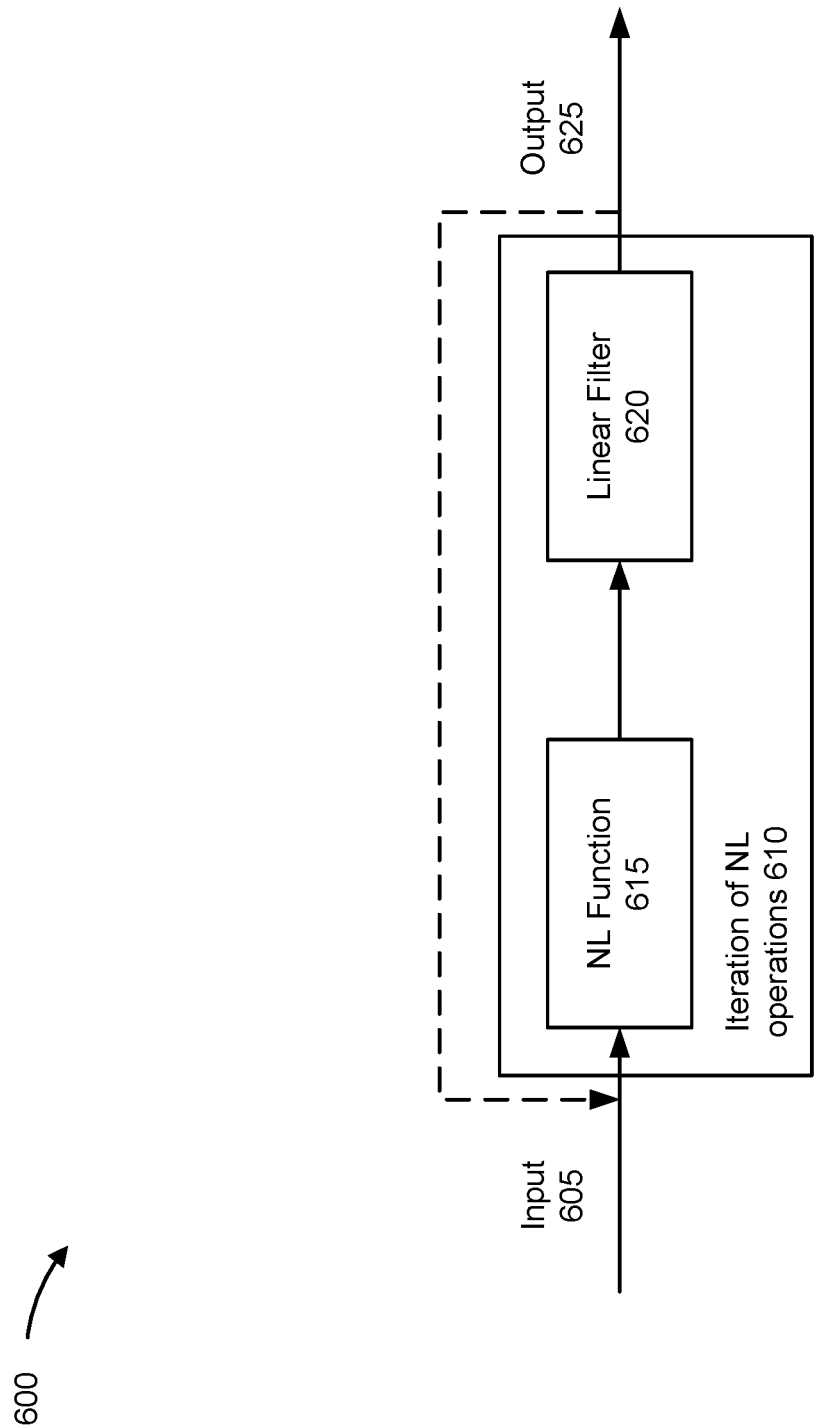
FIG. 6 is a diagram of an example associated with digital NL modeling, in accordance with the present disclosure.

FIG. 6 is a diagram of an example 600 associated with digital NL modeling, in accordance with the present disclosure. In connection with FIG. 6, a transmitting WCD (e.g., a UE 120, a network node 110, a CU, a DU, and/or an RU) may communicate with a receiving WCD (e.g., a UE 120, a base station 110, a CU, a DU, and/or an RU). In some aspects, the transmitting WCD and the receiving WCD may be part of a wireless network (e.g., wireless network 100).

The transmitting WCD and the receiving WCD may have established a wireless connection prior to operations shown in FIG. 6.

As shown in FIG. 6, a set of NL operations may include receiving an input 605. An iteration 610 of NL operations may include an NL function 615 and/or a linear filter 620. Each iteration of the NL operations may include providing the input 605 to the NL function 615 and from the NL function 615 to the linear filter 620. After performing a configured number of iterations 610 of the NL operations, the NL operations generate an output 625. The transmitting WCD may transmit the output (e.g., after performing one or more additional operations, such as front end unit operations, among other examples).

In some aspects, one or more parameters for NL operations may include the linear filter 620, the NL function 615, and/or a number of iterations 610 of the NL operations, among other examples. In some aspects, the CFR described in connection with FIG. 5 may include the NL function 615 and/or the linear filter 620 and/or may perform the NL operations described in connection with FIG. 6.

As indicated above, FIG. 6 is provided as an example. Other examples may differ from what is described with regard to FIG. 6.

Figure 7:
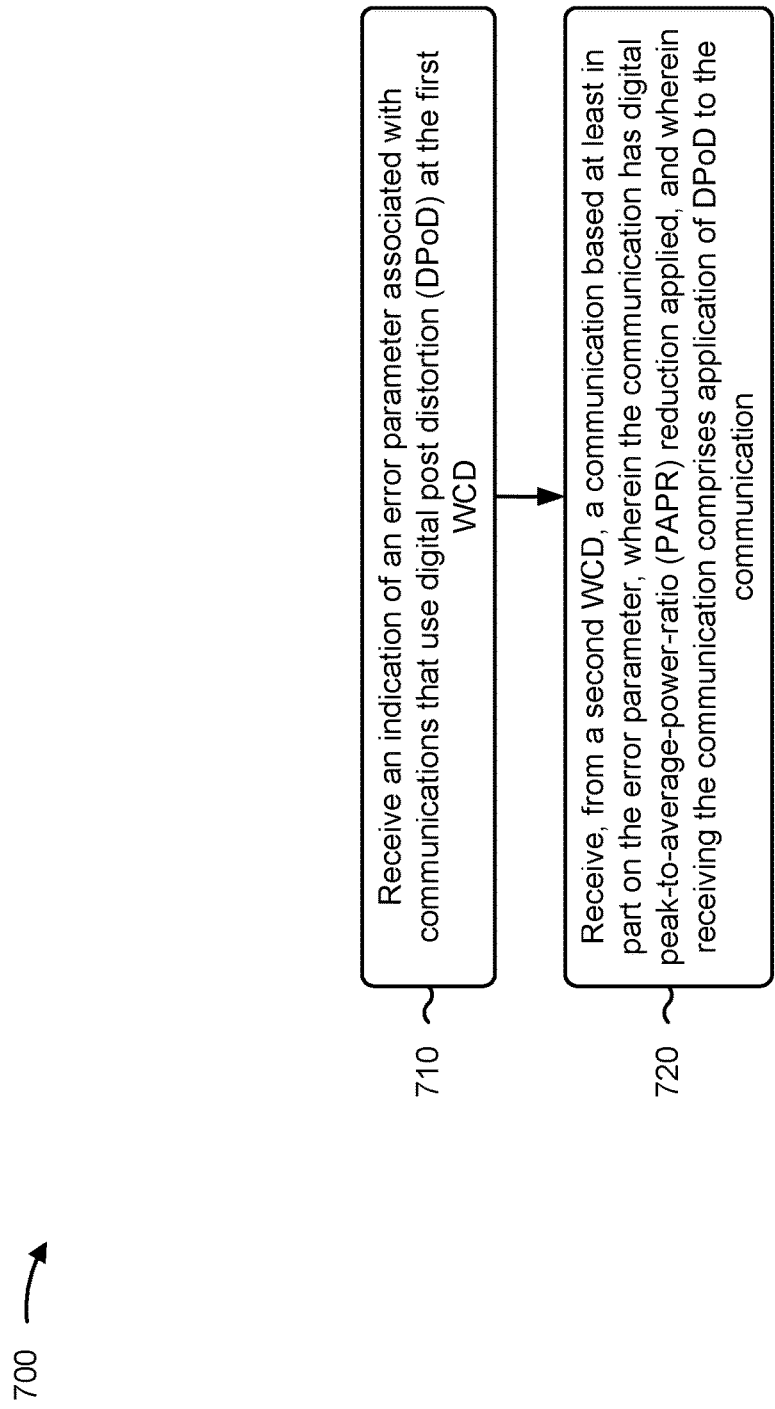
FIG. 7 is a diagram illustrating an example process performed, for example, by a first wireless communication device (WCD), in accordance with the present disclosure.

FIG. 7 is a diagram illustrating an example process 700 performed, for example, by a first WCD, in accordance with the present disclosure. Example process 700 is an example where the WCD (e.g., a UE, network node 110, a CU, a DU, an RU, and/or a relay) performs operations associated with error parameters for communications that use DPoD at a receiving device.

As shown in FIG. 7, in some aspects, process 700 may include receiving an indication of an error parameter associated with communications that use DPoD at the first WCD (block 710). For example, the WCD (e.g., using communication manager 140 or 150 and/or reception component 902) depicted in FIG. 9 may receive an indication of an error parameter associated with communications that use DPoD at the first WCD, as described above.

As further shown in FIG. 7, in some aspects, process 700 may include receiving, from a second WCD, a communication based at least in part on the error parameter, wherein the communication has digital PAPR reduction applied, and wherein receiving the communication comprises application of DPoD to the communication (block 720). For example, the WCD (e.g., using communication manager 140 or 150 and/or reception component 902) depicted in FIG. 9 may receive, from a second WCD, a communication based at least in part on the error parameter, wherein the communication has digital PAPR reduction applied, and wherein receiving the communication comprises application of DPoD to the communication, as described above.

Process 700 may include additional aspects, such as any single aspect or any combination of aspects described below and/or in connection with one or more other processes described elsewhere herein.

In a first aspect, process 700 includes receiving an indication of an additional error parameter associated with communications that do not use DPoD at the first WCD, and receiving an additional communication based at least in part on the additional error parameter.

In a second aspect, alone or in combination with the first aspect, an amount of error permitted in associated with the error parameter is greater than an amount of error permitted in associated with the additional error parameter.

In a third aspect, alone or in combination with one or more of the first and second aspects, the error parameter comprises an EVM parameter.

In a fourth aspect, alone or in combination with one or more of the first through third aspects, process 700 includes receiving an indication of a function used by the second WCD to apply PAPR reduction.

In a fifth aspect, alone or in combination with one or more of the first through fourth aspects, application of DPoD to the communication comprises application of DPoD that is based at least in part on the function used to apply PAPR reduction.

In a sixth aspect, alone or in combination with one or more of the first through fifth aspects, the indication of the function comprises one or more of an indication of one or more of a frequency selectivity, a clipping model, or a number of iterations used in the function, a selection of the function from a set of candidate functions used to apply PAPR reduction, or a PAPR output of the function.

In a seventh aspect, alone or in combination with one or more of the first through sixth aspects, a function used by the second WCD to apply PAPR reduction is based at least in part on one or more of a negotiation of function parameters between the first WCD and the second WCD, a MCS of the communications, a waveform of the communications, or a rank of the communications.

In an eighth aspect, alone or in combination with one or more of the first through seventh aspects, the error parameter is associated with one or more of an error of a transmitted signal as provided at an input to a power amplifier of the second WCD, or an error of the transmitted signal as provided at an output of the power amplifier of the second WCD.

In a ninth aspect, alone or in combination with one or more of the first through eighth aspects, process 700 includes transmitting an indication of support for an error parameter that is associated with communications that use DPoD at the WCD.

In a tenth aspect, alone or in combination with one or more of the first through ninth aspects, process 700 includes transmitting an indication of one or more parameters for selection of the error parameter associated with communications that use DPoD at the WCD.

In an eleventh aspect, alone or in combination with one or more of the first through tenth aspects, the error parameter is based at least in part on one or more of a MCS of the communications, a waveform of the communications, or a rank of the communications.

In a twelfth aspect, alone or in combination with one or more of the first through eleventh aspects, the first WCD comprises one or more of a UE, an RU, a DU, a CU, or a relay, and wherein the second WCD comprises one or more of a UE, an RU, a DU, a CU, or a relay.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
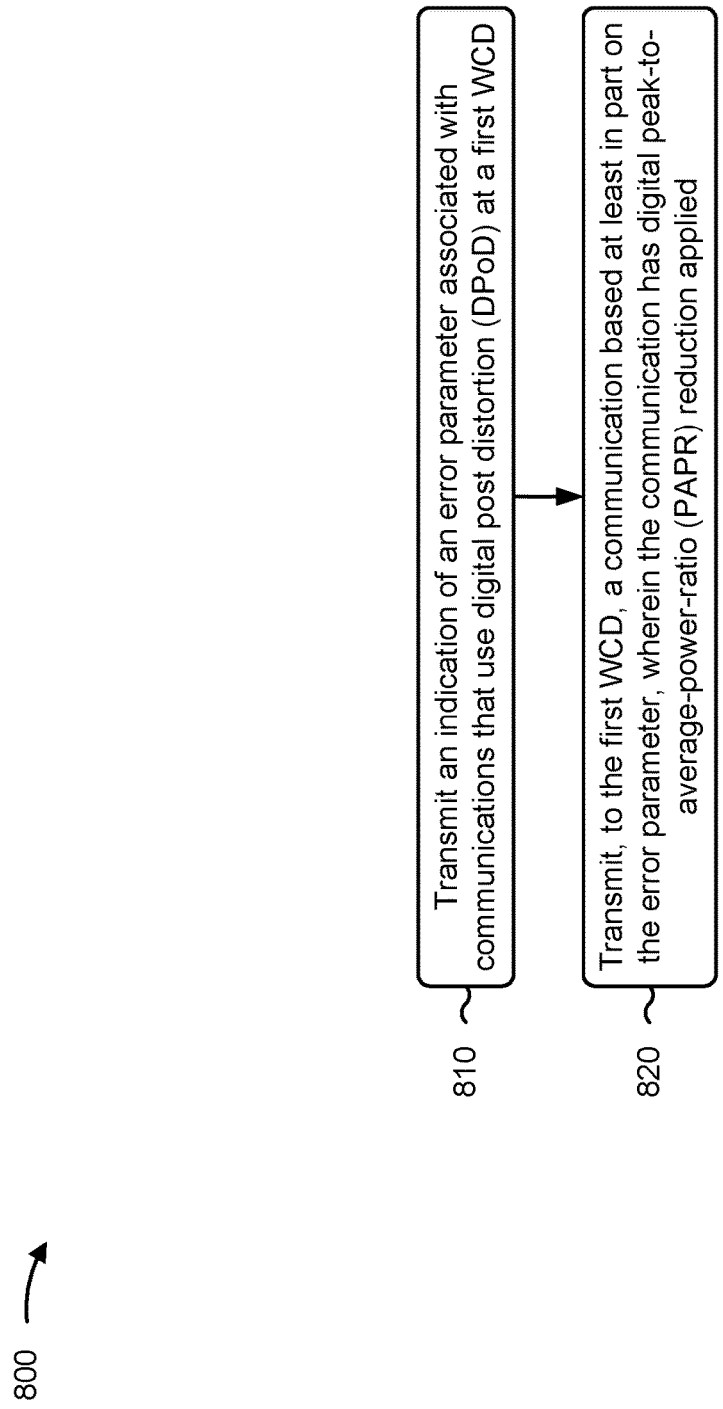
FIG. 8 is a diagram illustrating an example process performed, for example, by a second WCD, in accordance with the present disclosure.

FIG. 8 is a diagram illustrating an example process 800 performed, for example, by a second WCD, in accordance with the present disclosure. Example process 800 is an example where the WCD (e.g., a UE, network node 110, a CU, a DU, an RU, and/or a relay) performs operations associated with error parameters for communications that use DPoD at a receiving device.

As shown in FIG. 8, in some aspects, process 800 may include transmitting an indication of an error parameter associated with communications that use DPoD at a first WCD (block 810). For example, the WCD (e.g., using communication manager 140 or 150 and/or transmission component 1004, depicted in FIG. 10) may transmit an indication of an error parameter associated with communications that use DPoD at a first WCD, as described above.

As further shown in FIG. 8, in some aspects, process 800 may include transmitting, to the first WCD, a communication based at least in part on the error parameter, wherein the communication has digital PAPR reduction applied (block 820). For example, the WCD (e.g., using communication manager 140 or 150 and/or transmission component 1004, depicted in FIG. 10) may transmit, to the first WCD, a communication based at least in part on the error parameter, wherein the communication has digital PAPR reduction applied, as described above.

Process 800 may include additional aspects, such as any single aspect or any combination of aspects described below and/or in connection with one or more other processes described elsewhere herein.

In a first aspect, process 800 includes transmitting an indication of an additional error parameter associated with communications that do not use DPoD at the first WCD, and transmitting an additional communication based at least in part on the additional error parameter.

In a second aspect, alone or in combination with the first aspect, an amount of error permitted in associated with the error parameter is greater than an amount of error permitted in associated with the additional error parameter.

In a third aspect, alone or in combination with one or more of the first and second aspects, the error parameter comprises an EVM parameter.

In a fourth aspect, alone or in combination with one or more of the first through third aspects, process 800 includes transmitting an indication of a function used by the second WCD to apply PAPR reduction.

In a fifth aspect, alone or in combination with one or more of the first through fourth aspects, the indication of the function comprises one or more of an indication of one or more of a frequency selectivity, a clipping model, or a number of iterations used in the function, a selection of the function from a set of candidate functions used to apply PAPR reduction, or a PAPR output of the function.

In a sixth aspect, alone or in combination with one or more of the first through fifth aspects, a function used by the second WCD to apply PAPR reduction is based at least in part on one or more of a negotiation of function parameters between the first WCD and the second WCD, a MCS of the communications, a waveform of the communications, or a rank of the communications.

In a seventh aspect, alone or in combination with one or more of the first through sixth aspects, the error parameter is associated with one or more of an error of a transmitted signal as provided at an input to a power amplifier of the second WCD, or an error of the transmitted signal as provided at an output of the power amplifier of the second WCD.

In an eighth aspect, alone or in combination with one or more of the first through seventh aspects, process 800 includes receiving an indication of support for an error parameter that is associated with communications that use DPoD at the WCD.

In a ninth aspect, alone or in combination with one or more of the first through eighth aspects, process 800 includes receiving an indication of one or more parameters for selection of the error parameter associated with communications that use DPoD at the WCD.

In a tenth aspect, alone or in combination with one or more of the first through ninth aspects, the error parameter is based at least in part on one or more of a MCS of the communications, a waveform of the communications, or a rank of the communications.

In an eleventh aspect, alone or in combination with one or more of the first through tenth aspects, the first WCD comprises one or more of a UE, a RU, a DU, a CU, or a relay, and wherein the second WCD comprises one or more of a UE, an RU, a DU, a CU, or a relay.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
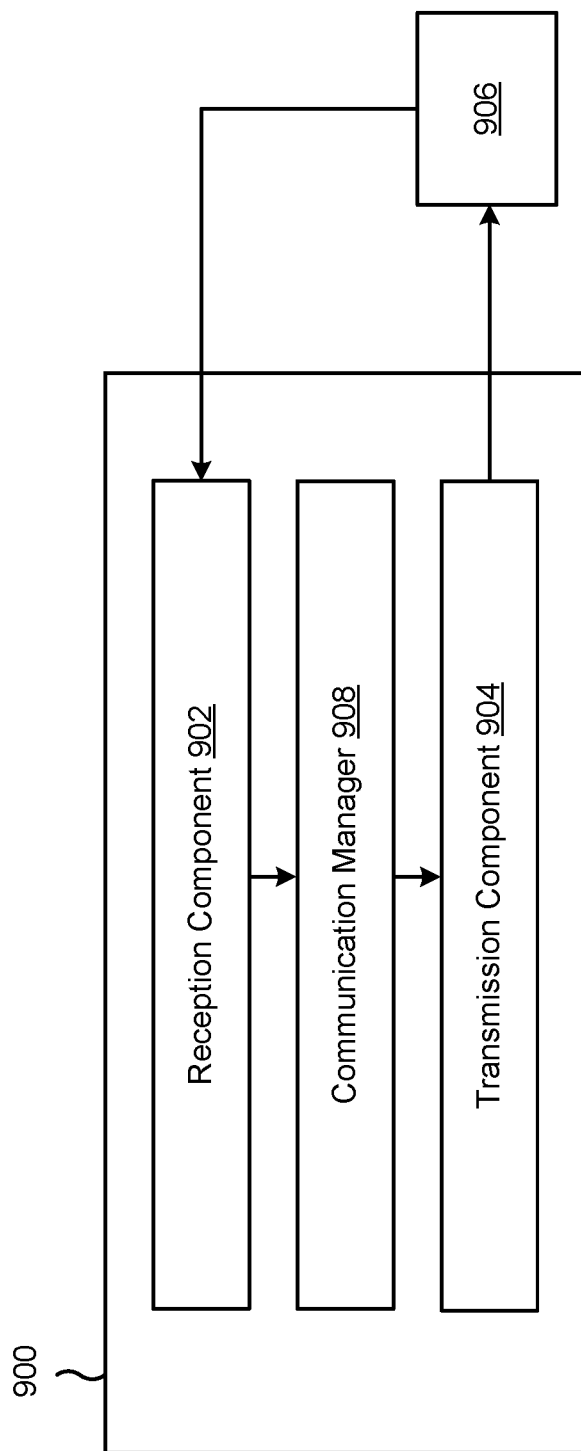
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a first WCD, or a first WCD may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908 (e.g., the communication manager 140 or 150).

In some aspects, the apparatus 900 may be configured to perform one or more operations described herein in connection with FIGS. 5-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the first WCD described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the first WCD described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the first WCD described in connection with FIG. 2. In some aspects, the transmission component 904 may be co-located with the reception component 902 in a transceiver.

The reception component 902 may receive an indication of an error parameter associated with communications that use DPoD at the first WCD. The reception component 902 may receive, from a second WCD, a communication based at least in part on the error parameter, wherein the communication has digital PAPR reduction applied, and wherein receiving the communication comprises application of DPoD to the communication.

The reception component 902 may receive an indication of an additional error parameter associated with communications that do not use DPoD at the first WCD.

The reception component 902 may receive an additional communication based at least in part on the additional error parameter.

The reception component 902 may receive an indication of a function used by the second WCD to apply PAPR reduction.

The transmission component 904 may transmit an indication of support for an error parameter that is associated with communications that use DPoD at the WCD.

The transmission component 904 may transmit an indication of one or more parameters for selection of the error parameter associated with communications that use DPoD at the WCD.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
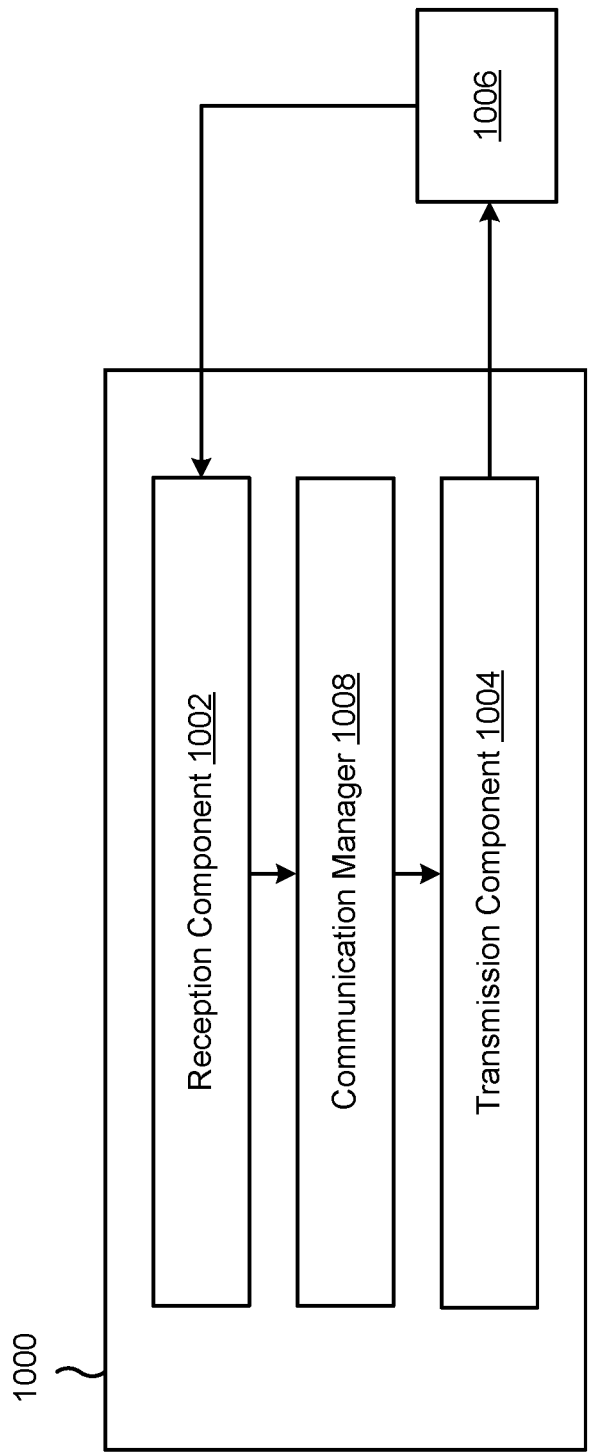
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a second WCD, or a second WCD may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008 (e.g., the communication manager 140 or 150).

In some aspects, the apparatus 1000 may be configured to perform one or more operations described herein in connection with FIGS. 5-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the second WCD described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the second WCD described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the second WCD described in connection with FIG. 2. In some aspects, the transmission component 1004 may be co-located with the reception component 1002 in a transceiver.

The transmission component 1004 may transmit an indication of an error parameter associated with communications that use DPoD at a first WCD. The transmission component 1004 may transmit, to the first WCD, a communication based at least in part on the error parameter, wherein the communication has digital PAPR reduction applied.

The transmission component 1004 may transmit an indication of an additional error parameter associated with communications that do not use DPoD at the first WCD.

The transmission component 1004 may transmit an additional communication based at least in part on the additional error parameter.

The transmission component 1004 may transmit an indication of a function used by the second WCD to apply PAPR reduction.

The reception component 1002 may receive an indication of support for an error parameter that is associated with communications that use DPoD at the WCD.

The reception component 1002 may receive an indication of one or more parameters for selection of the error parameter associated with communications that use DPoD at the WCD.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a first wireless communication device (WCD), comprising: receiving an indication of an error parameter associated with communications that use digital post distortion (DPoD) at the first WCD; and receiving, from a second WCD, a communication based at least in part on the error parameter, wherein the communication has digital peak-to-average-power-ratio (PAPR) reduction applied, and wherein receiving the communication comprises application of DPoD to the communication.

Aspect 2: The method of Aspect 1, further comprising: receiving an indication of an additional error parameter associated with communications that do not use DPoD at the first WCD; and receiving an additional communication based at least in part on the additional error parameter.

Aspect 3: The method of Aspect 2, wherein an amount of error permitted in associated with the error parameter is greater than an amount of error permitted in associated with the additional error parameter.

Aspect 4: The method of any of Aspects 1-3, wherein the error parameter comprises an error vector magnitude (EVM) parameter.

Aspect 5: The method of any of Aspects 1-4, further comprising: receiving an indication of a function used by the second WCD to apply PAPR reduction.

Aspect 6: The method of Aspect 5, wherein application of DPoD to the communication comprises: application of DPoD that is based at least in part on the function used to apply PAPR reduction.

Aspect 7: The method of any of Aspects 5-6, wherein the indication of the function comprises one or more of: an indication of one or more of a frequency selectivity, a clipping model, or a number of iterations used in the function, a selection of the function from a set of candidate functions used to apply PAPR reduction, or a PAPR output of the function.

Aspect 8: The method of any of Aspects 1-7, wherein a function used by the second WCD to apply PAPR reduction is based at least in part on one or more of: a negotiation of function parameters between the first WCD and the second WCD, a modulation and coding scheme (MCS) of the communications, a waveform of the communications, or a rank of the communications.

Aspect 9: The method of any of Aspects 1-8, wherein the error parameter is associated with one or more of: an error of a transmitted signal as provided at an input to a power amplifier of the second WCD, or an error of the transmitted signal as provided at an output of the power amplifier of the second WCD.

Aspect 10: The method of any of Aspects 1-9, further comprising: transmitting an indication of support for an error parameter that is associated with communications that use DPoD at the WCD.

Aspect 11: The method of any of Aspects 1-10, further comprising: transmitting an indication of one or more parameters for selection of the error parameter associated with communications that use DPoD at the WCD.

Aspect 12: The method of any of Aspects 1-11, wherein the error parameter is based at least in part on one or more of: a modulation and coding scheme (MCS) of the communications, a waveform of the communications, or a rank of the communications.

Aspect 13: The method of any of Aspects 1-12, wherein the first WCD comprises one or more of a user equipment (UE), a radio unit (RU), a distributed unit (DU), a control unit (CU), or a relay, and wherein the second WCD comprises one or more of a UE, an RU, a DU, a CU, or a relay.

Aspect 14: A method of wireless communication performed by a second wireless communication device (WCD), comprising: transmitting an indication of an error parameter associated with communications that use digital post distortion (DPoD) at a first WCD; and transmitting, to the first WCD, a communication based at least in part on the error parameter, wherein the communication has digital peak-to-average-power-ratio (PAPR) reduction applied.

Aspect 15: The method of Aspect 14, further comprising: transmitting an indication of an additional error parameter associated with communications that do not use DPoD at the first WCD; and transmitting an additional communication based at least in part on the additional error parameter.

Aspect 16: The method of Aspect 15, wherein an amount of error permitted in associated with the error parameter is greater than an amount of error permitted in associated with the additional error parameter.

Aspect 17: The method of any of Aspects 14-16, wherein the error parameter comprises an error vector magnitude (EVM) parameter.

Aspect 18: The method of any of Aspects 14-17, further comprising: transmitting an indication of a function used by the second WCD to apply PAPR reduction.

Aspect 19: The method of Aspect 18, wherein the indication of the function comprises one or more of: an indication of one or more of a frequency selectivity, a clipping model, or a number of iterations used in the function, a selection of the function from a set of candidate functions used to apply PAPR reduction, or a PAPR output of the function.

Aspect 20: The method of any of Aspects 14-19, wherein a function used by the second WCD to apply PAPR reduction is based at least in part on one or more of: a negotiation of function parameters between the first WCD and the second WCD, a modulation and coding scheme (MCS) of the communications, a waveform of the communications, or a rank of the communications.

Aspect 21: The method of any of Aspects 14-20, wherein the error parameter is associated with one or more of: an error of a transmitted signal as provided at an input to a power amplifier of the second WCD, or an error of the transmitted signal as provided at an output of the power amplifier of the second WCD.

Aspect 22: The method of any of Aspects 14-21, further comprising: receiving an indication of support for an error parameter that is associated with communications that use DPoD at the WCD.

Aspect 23: The method of any of Aspects 14-22, further comprising: receiving an indication of one or more parameters for selection of the error parameter associated with communications that use DPoD at the WCD.

Aspect 24: The method of any of Aspects 14-23, wherein the error parameter is based at least in part on one or more of: a modulation and coding scheme (MCS) of the communications, a waveform of the communications, or a rank of the communications.

Aspect 25: The method of any of Aspects 14-24, wherein the first WCD comprises one or more of a user equipment (UE), a radio unit (RU), a distributed unit (DU), a control unit (CU), or a relay, and wherein the second WCD comprises one or more of a UE, an RU, a DU, a CU, or a relay.

Aspect 26: An apparatus for wireless communication at a device, comprising a processor; memory coupled with the processor; and instructions stored in the memory and executable by the processor to cause the apparatus to perform the method of one or more of Aspects 1-25.

Aspect 27: A device for wireless communication, comprising a memory and one or more processors coupled to the memory, the one or more processors configured to perform the method of one or more of Aspects 1-25.

Aspect 28: An apparatus for wireless communication, comprising at least one means for performing the method of one or more of Aspects 1-25.

Aspect 29: A non-transitory computer-readable medium storing code for wireless communication, the code comprising instructions executable by a processor to perform the method of one or more of Aspects 1-25.

Aspect 30: A non-transitory computer-readable medium storing a set of instructions for wireless communication, the set of instructions comprising one or more instructions that, when executed by one or more processors of a device, cause the device to perform the method of one or more of Aspects 1-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first wireless communication device (WCD) for wireless communication, comprising:
   a memory; and
   one or more processors, coupled to the memory, configured to:
   receive an indication of an error parameter associated with communications that use digital post distortion (DPoD) at the first WCD;
   receive, from a second WCD, a communication based at least in part on the error parameter, wherein the communication has digital peak-to-average-power-ratio (PAPR) reduction applied, and wherein reception of the communication comprises application of DPoD to the communication; and receive an additional communication based at least in part on an additional error parameter associated with communications that do not use DPoD at the first WCD, wherein an amount of error permitted in the communication based at least in part on the error parameter is greater than an amount of error permitted in the communication in the communication based at least in part on the additional error parameter.

2. The WCD of claim 1, wherein the one or more processors are further configured to:

receive an indication of the additional error parameter associated with communications that do not use DPoD at the first WCD.

3. The WCD of claim 1, wherein the error parameter comprises an error vector magnitude (EVM) parameter.

4. The WCD of claim 1, wherein a function used by the second WCD to apply PAPR reduction is based at least in part on one or more of:

a negotiation of function parameters between the first WCD and the second WCD, a modulation and coding scheme (MCS) of the communications, a waveform of the communications, or a rank of the communications.

5. The WCD of claim 1, wherein the error parameter is associated with one or more of:

an error of a transmitted signal as provided at an input to a power amplifier of the second WCD, or an error of the transmitted signal as provided at an output of the power amplifier of the second WCD.

6. The WCD of claim 1, wherein the one or more processors are further configured to:

transmit an indication of support for an error parameter that is associated with communications that use DPoD at the WCD.

7. The WCD of claim 1, wherein the one or more processors are further configured to:

transmit an indication of one or more parameters for selection of the error parameter associated with communications that use DPoD at the WCD.

8. The WCD of claim 1, wherein the error parameter is based at least in part on one or more of:

a modulation and coding scheme (MCS) of the communications, a waveform of the communications, or a rank of the communications.

9. The WCD of claim 1, wherein the first WCD comprises one or more of a user equipment (UE), a radio unit (RU), a distributed unit (DU), a control unit (CU), or a relay, and wherein the second WCD comprises one or more of a UE, an RU, a DU, a CU, or a relay.

10. A first wireless communication device (WCD) for wireless communication, comprising:

a memory; and one or more processors, coupled to the memory, configured to:

receive an indication of an error parameter associated with communications that use digital post distortion (DPoD) at the first WCD;

receive, from a second WCD, a communication based at least in part on the error parameter, wherein the communication has digital peak-to-average-power-ratio (PAPR) reduction applied, and wherein reception of the communication comprises application of DPoD to the communication; and receive an indication of a function used by the second WCD to apply PAPR reduction.

11. The WCD of claim 10, wherein application of DPoD to the communication comprises:

application of DPoD that is based at least in part on the function used to apply PAPR reduction.

12. The WCD of claim 10, wherein the indication of the function comprises one or more of:

an indication of one or more of a frequency selectivity, a clipping model, or a number of iterations used in the function, a selection of the function from a set of candidate functions used to apply PAPR reduction, or a PAPR output of the function.

13. The apparatus of claim 10, wherein the one or more processors configured to receive an indication of a function used by the second WCD to apply PAPR reduction comprises one or more processors configured to receive an explicit indication of a function used by the second WCD to apply PAPR reduction.

14. A second wireless communication device (WCD) for wireless communication, comprising:

a memory; and one or more processors, coupled to the memory, configured to:

transmit an indication of an error parameter associated with communications that use digital post distortion (DPoD) at a first WCD;

transmit, to the first WCD, a communication based at least in part on the error parameter, wherein the communication has digital peak-to-average-power-ratio (PAPR) reduction applied; and transmit, to the first WCD, an additional communication based at least in part on an additional error parameter associated with communications that do not use DPoD at the first WCD, wherein an amount of error permitted in the communication based at least in part on the error parameter is greater than an amount of error permitted in the communication based at least in part on the additional error parameter.

15. The WCD of claim 14, wherein the one or more processors are further configured to:

transmit an indication of the additional error parameter associated with communications that do not use DPoD at the first WCD.

16. The WCD of claim 14, wherein the error parameter comprises an error vector magnitude (EVM) parameter.

17. The WCD of claim 14, wherein a function used by the second WCD to apply PAPR reduction is based at least in part on one or more of:

a negotiation of function parameters between the first WCD and the second WCD, a modulation and coding scheme (MCS) of the communications, a waveform of the communications, or a rank of the communications.

18. The WCD of claim 14, wherein the error parameter is associated with one or more of:

an error of a transmitted signal as provided at an input to a power amplifier of the second WCD, or an error of the transmitted signal as provided at an output of the power amplifier of the second WCD.

19. The WCD of claim 14, wherein the one or more processors are further configured to:

receive an indication of support for an error parameter that is associated with communications that use DPoD at the WCD.

20. The WCD of claim 14, wherein the one or more processors are further configured to:
receive an indication of one or more parameters for selection of the error parameter associated with communications that use DPoD at the WCD.

21. The WCD of claim 14, wherein the error parameter is based at least in part on one or more of:
a modulation and coding scheme (MCS) of the communications,
a waveform of the communications, or
a rank of the communications.

22. The WCD of claim 14, wherein the first WCD comprises one or more of a user equipment (UE), a radio unit (RU), a distributed unit (DU), a control unit (CU), or a relay, and
wherein the second WCD comprises one or more of a UE, an RU, a DU, a CU, or a relay.

23. A second wireless communication device (WCD) for wireless communication, comprising:
a memory; and
one or more processors, coupled to the memory, configured to:
transmit an indication of an error parameter associated with communications that use digital post distortion (DPoD) at a first WCD;
transmit, to the first WCD, a communication based at least in part on the error parameter, wherein the communication has digital peak-to-average-power-ratio (PAPR) reduction applied; and
transmit an indication of a function used by the second WCD to apply PAPR reduction.

24. The WCD of claim 23, wherein the indication of the function comprises one or more of:
an indication of one or more of a frequency selectivity, a clipping model, or a number of iterations used in the function,
a selection of the function from a set of candidate functions used to apply PAPR reduction, or
a PAPR output of the function.

25. The apparatus of claim 23, wherein the one or more processors configured to transmit an indication of a function used by the second WCD to apply PAPR reduction comprises one or more processors configured to transmit an explicit indication of a function used by the second WCD to apply PAPR reduction.

26. A method of wireless communication performed by a first wireless communication device (WCD), comprising:
receiving an indication of an error parameter associated with communications that use digital post distortion (DPoD) at the first WCD;
receiving, from a second WCD, a communication based at least in part on the error parameter, wherein the communication has digital peak-to-average-power-ratio (PAPR) reduction applied, and wherein receiving the communication comprises application of DPoD to the communication; and
receiving an indication of a function used by the second WCD to apply PAPR reduction.

27. The method of claim 26, wherein application of DPoD to the communication comprises:
application of DPoD that is based at least in part on the function used to apply PAPR reduction.

28. The method of claim 26, wherein receiving an indication of a function used by the second WCD to apply PAPR reduction comprises receiving an explicit indication of the function used by the second WCD to apply PAPR reduction.

29. A method of wireless communication performed by a second wireless communication device (WCD), comprising:
transmitting an indication of an error parameter associated with communications that use digital post distortion (DPoD) at a first WCD;
transmitting, to the first WCD, a communication based at least in part on the error parameter, wherein the communication has digital peak-to-average-power-ratio (PAPR) reduction applied; and
transmitting an indication of a function used by the second WCD to apply PAPR reduction.

30. The method of claim 29, wherein transmitting an indication of a function used by the second WCD to apply PAPR reduction comprises transmitting an explicit indication of the function used by the second WCD to apply PAPR reduction.

* * * * *